US006865797B2

(12) United States Patent
Walko et al.

(10) Patent No.: US 6,865,797 B2
(45) Date of Patent: Mar. 15, 2005

(54) APPARATUS FOR LOCATING AND STACKING PUNCHINGS FOR A GENERATOR CORE

(75) Inventors: Steven Charles Walko, Clifton Park, NY (US); John Anthony Petti, Schenectady, NY (US); Frank Joseph Zwack, Stephentown, NY (US)

(73) Assignee: General Electric Company, Schenectady, NY (US)

( * ) Notice: Subject to any disclaimer, the term of this patent is extended or adjusted under 35 U.S.C. 154(b) by 224 days.

(21) Appl. No.: 10/195,310

(22) Filed: Jul. 16, 2002

(65) Prior Publication Data

US 2004/0010906 A1 Jan. 22, 2004

(51) Int. Cl.[7] .................. H02K 15/00; H02K 15/14; H02K 15/16
(52) U.S. Cl. .................. 29/596; 29/598; 29/609; 29/732; 29/738; 310/216; 310/258; 310/259
(58) Field of Search .......................... 29/596, 598, 609, 29/732, 738; 310/216, 258, 259

(56) References Cited

U.S. PATENT DOCUMENTS

| 3,652,889 A | * | 3/1972 | Reece et al. ................. 310/259 |
| 6,448,686 B1 | * | 9/2002 | Dawson et al. ............. 310/254 |
| 6,578,255 B2 | * | 6/2003 | Lawrence et al. ............ 29/609 |

* cited by examiner

*Primary Examiner*—Carl J. Arbes
*Assistant Examiner*—Tim Phan
(74) *Attorney, Agent, or Firm*—Nixon & Vanderhye

(57) ABSTRACT

Punchings for stator core laminations of a generator stator frame are disposed on a rotary table to form annular arrays of punching, with each layer staggered relative to adjacent layers. A mandrel is disposed at the center of the table and has fingers projecting radially for receiving the slots of the punchings to facilitate location of the punchings on the table and relative to one another. An annular cover is provided and disposed over the uppermost layer of punchings and clamped to the superposed sets of annular layers of punchings. The cover and punchings can then be removed from the table for disposition in the generator stator frame. The fingers on the mandrel are displaced vertically relative to the table as the height of the punchings on the table increases.

10 Claims, 7 Drawing Sheets

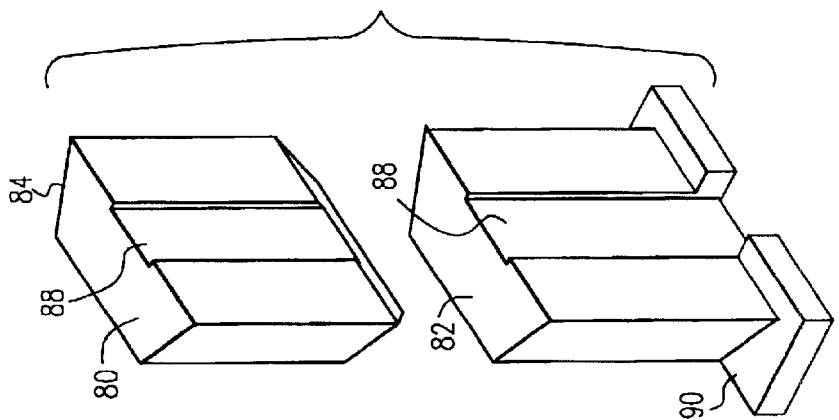
Fig.10
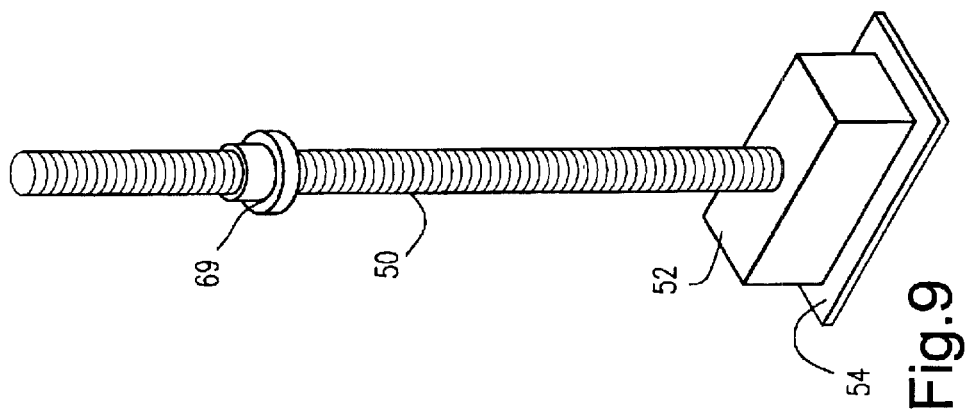
Fig.9
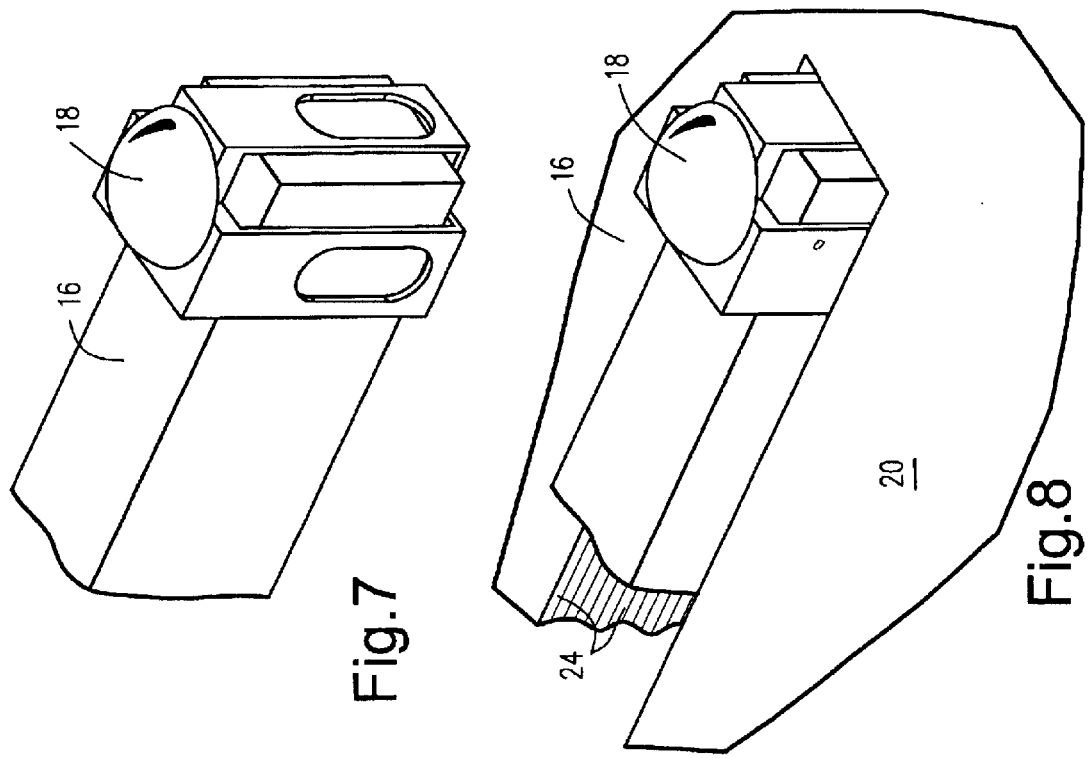
Fig.7
Fig.8

APPARATUS FOR LOCATING AND STACKING PUNCHINGS FOR A GENERATOR CORE

BACKGROUND OF THE INVENTION

The present invention relates to apparatus and methods for locating and stacking punchings to form generally annular arrays of superposed punchings and particularly relates to apparatus and methods for packaging punchings in annular arrays to facilitate lifting secured sets thereof and disposition in a generator stator frame.

Stator core laminations, i.e., punchings, are generally arranged in a plurality of annular arrays thereof forming sets or packets of adjacent stator core laminations. The sets of annular arrays of laminations are axially spaced one from the other by space blocks and installed in a generator stator frame. The space blocks define ventilation passages for directing a cooling flow radially through the stator. Typically, the assembly of the laminations into the generator stator frame is performed manually by disposing the laminations on dovetail-shaped keybars which have male projections complementary to the female projections along the outer diameter of the individual laminations. An alignment gauge is manually employed to align the punchings relative to one another and in the stator frame. It will be appreciated that the generator stator frame is an area which is difficult to access, which compounds the problem of installing the punchings in the stator frame at appropriate locations.

BRIEF DESCRIPTION OF THE INVENTION

In accordance with a preferred embodiment of the present invention, there is provided apparatus and methods for locating and stacking punchings to form generally annular arrays of punchings superposed over one another for subsequent insertion into the generator stator frame. Particularly, the superposed annular arrays of punchings are arranged in sets of punchings on a support, e.g., a table, and subsequently lifted from the support for insertion into the generator stator core frame. Particularly, the support includes a table for receiving and stacking the punchings. The table is rotatable about a vertical axis and a punching insertion station is provided at which the punchings are individually disposed on the table to form an annular array thereof. Additional annual arrays of punchings are superposed one over the other to form a set thereof.

A mandrel is rotatable with the table about the axis and is rotatable and movable vertically relative to the table. The mandrel carries a plurality of radially extending fingers for reception in selected radial slots of the punchings. Thus, when placing the punchings on the table, the fingers guide the punchings on the table to form an accurately positioned annular array of punchings. As the multiple annular arrays or layers of punchings are placed on the table, the mandrel elevates relative to previously placed punchings to position the fingers at a height above the table to receive the slots of additional punchings. The punchings are also staggered relative to one another in a circumferential direction such that the joints between punchings in each annular array thereof are misaligned axially with joints between punchings of adjacent annular arrays thereof.

Upon arranging the punchings on the table in sets of multiple annular arrays thereof with space blocks between the sets, the fingers are removed. Clamps are applied to the multiple sets along the radial inner and outer margins to maintain the punchings and sets in the annular arrays thereof. A lift plate is applied to the uppermost set, enabling the sets of punchings in their annular arrays to be lifted from the table for disposition in the generator stator frame.

In a preferred embodiment of the present invention there is a preferred apparatus for locating and stacking punchings to form generally annular arrays of superposed punchings for use in a generator stator core, comprising a table rotatable about an axis for receiving and stacking the punchings; a mandrel rotatable with the table about the axis and located radially to the table and movable vertically relative to the table; and a plurality of circumferentially spaced fingers projecting generally radially outwardly from the mandrel for reception in radially inwardly opening slots of the punchings to guide the punchings received on the table to form the annular arrays of superposed punchings.

In a further preferred embodiment of the present invention there is an apparatus for locating and stacking punchings to form generally annular arrays of superposed punchings for use in a generator stator core, comprising a table rotatable about an axis for receiving and stacking the punchings; a plurality of circumferentially spaced guides rotatable with the table and projecting generally radially outwardly for reception in radially inwardly opening slots of the punchings to guide the punchings received on the table to form the annular arrays of superposed punchings; and a lift plate for overlying the table and the annular arrays of punchings, means carried by the lift plate for retaining the punchings in stacked annular arrays thereof enabling the stacked annular arrays of punchings to be lifted along with the lift plate from the table.

In a further preferred embodiment of the present invention there is a preferred method for locating and stacking punchings to form generally annular arrays of superposed punchings, comprising the steps of (a) disposing a plurality of punchings in side-by-side relation one after another on a support about an axis and in multiple layers one above another to form annular arrays of superposed punchings; (b) while performing step (a), disposing slots of the punchings about guide fingers to locate the punchings in the annular arrays thereof; (c) securing the annular arrays of superposed punchings to one another to form a set thereof; and (d) lifting the set of punchings from the support.

BRIEF DESCRIPTION OF THE DRAWINGS

FIG. 7 is a fragmentary enlarged perspective view of the end of one of the fingers;

FIG. 8 is a perspective view similar to FIG. 7 illustrating the finger in a slot of the punching;

FIG. 9 is a perspective view of a portion of a clamp for clamping the inner radius of the sets of punchings to one another for lifting; and FIG. 10 is a perspective view of blocks employed to facilitate clamping of the sets of clampings along the outer diameter thereof.

DETAILED DESCRIPTION OF THE INVENTION

Figure 1:
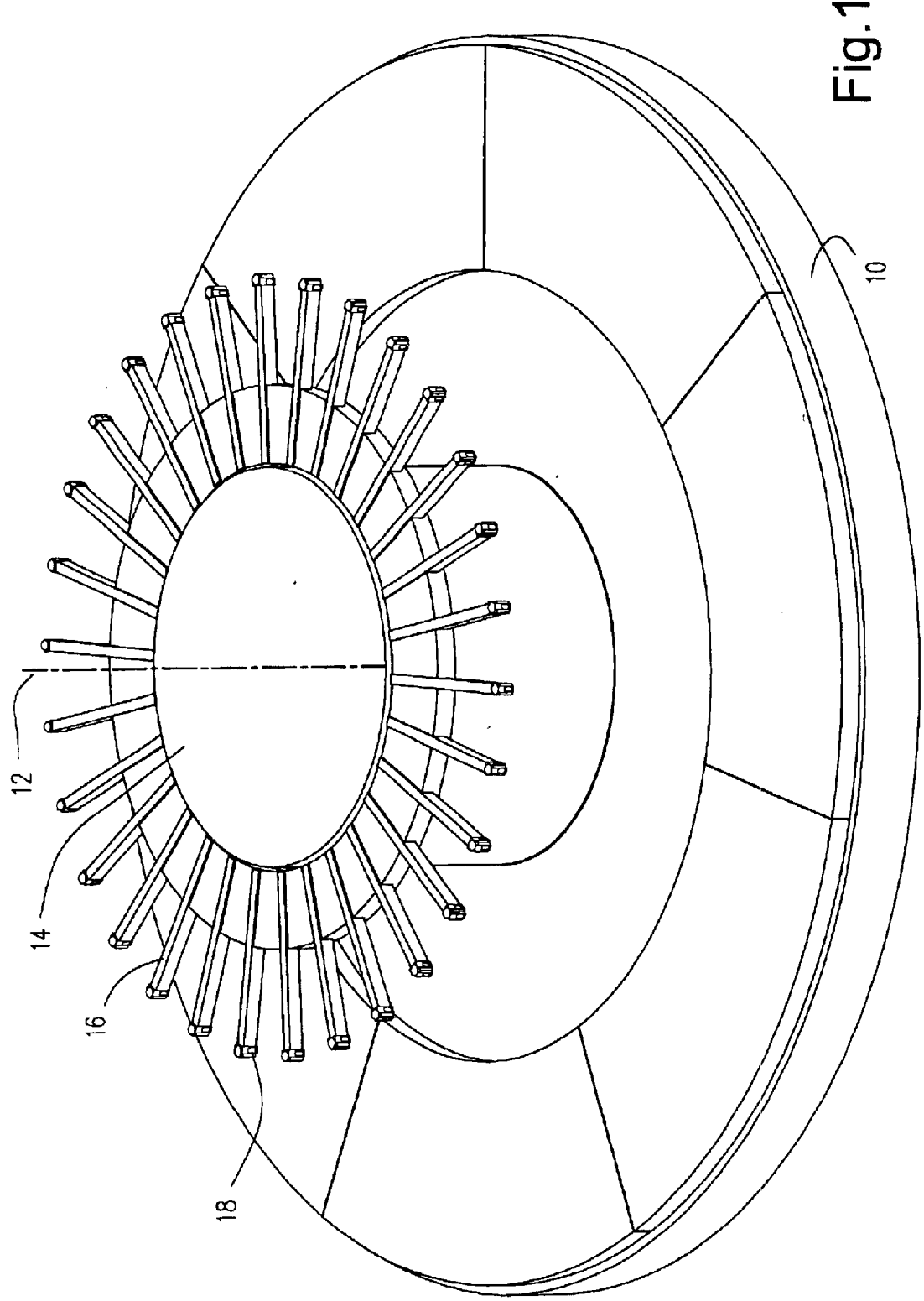
FIG. 1 is a schematic perspective view of a table, mandrel and locating fingers forming part of the apparatus for locating and stacking punchings according to a preferred embodiment of the present invention.
Figure 2:
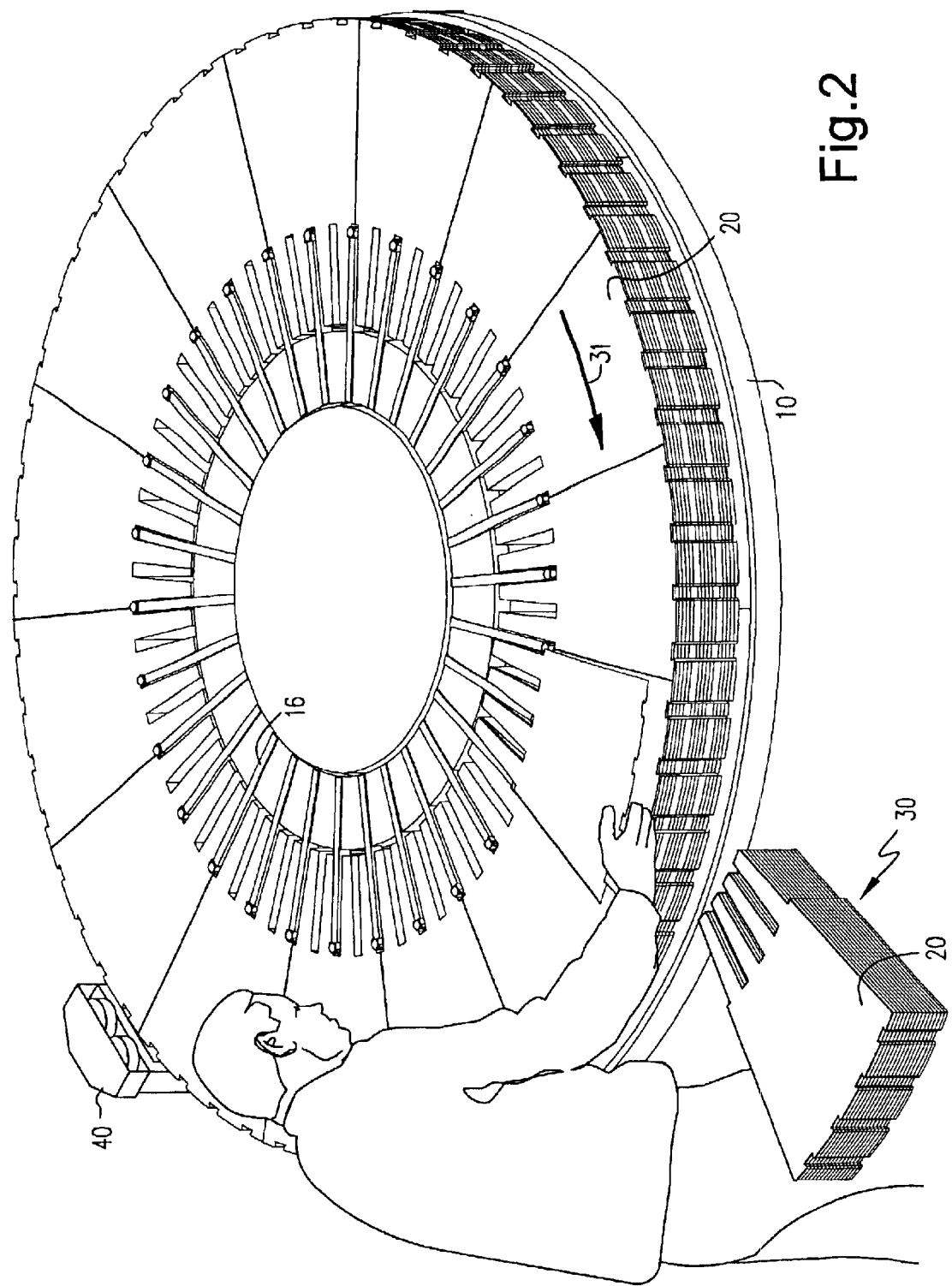
FIG. 2 is a schematic representation illustrating placement of individual punchings on the table to form stacked, annular arrays thereof.

Referring now to the drawings, and particularly to FIGS. 1 and 2, there is illustrated a support, e.g., a table 10, mounted for rotation about an axis 12 by a suitable drive, for example, an electric, hydraulic or pneumatic motor, not shown. The table 10 is preferably annular in form and surrounds a mandrel 14 rotatable about axis 12 with table 10. Mandrel 14 is also adjustable in elevation relative to table 10. Like the table, the mandrel may be elevated by any suitable, drive, preferably an electric motor. As illustrated, the mandrel mounts a plurality of radially outwardly extending fingers 16 which are rotatable with the mandrel 14 and adjustable in height as the mandrel's height is adjusted. The tips of the fingers 16 terminate in guides 18 for guiding and locating the punchings about the table in annular arrays thereof as described below.

Figure 4:
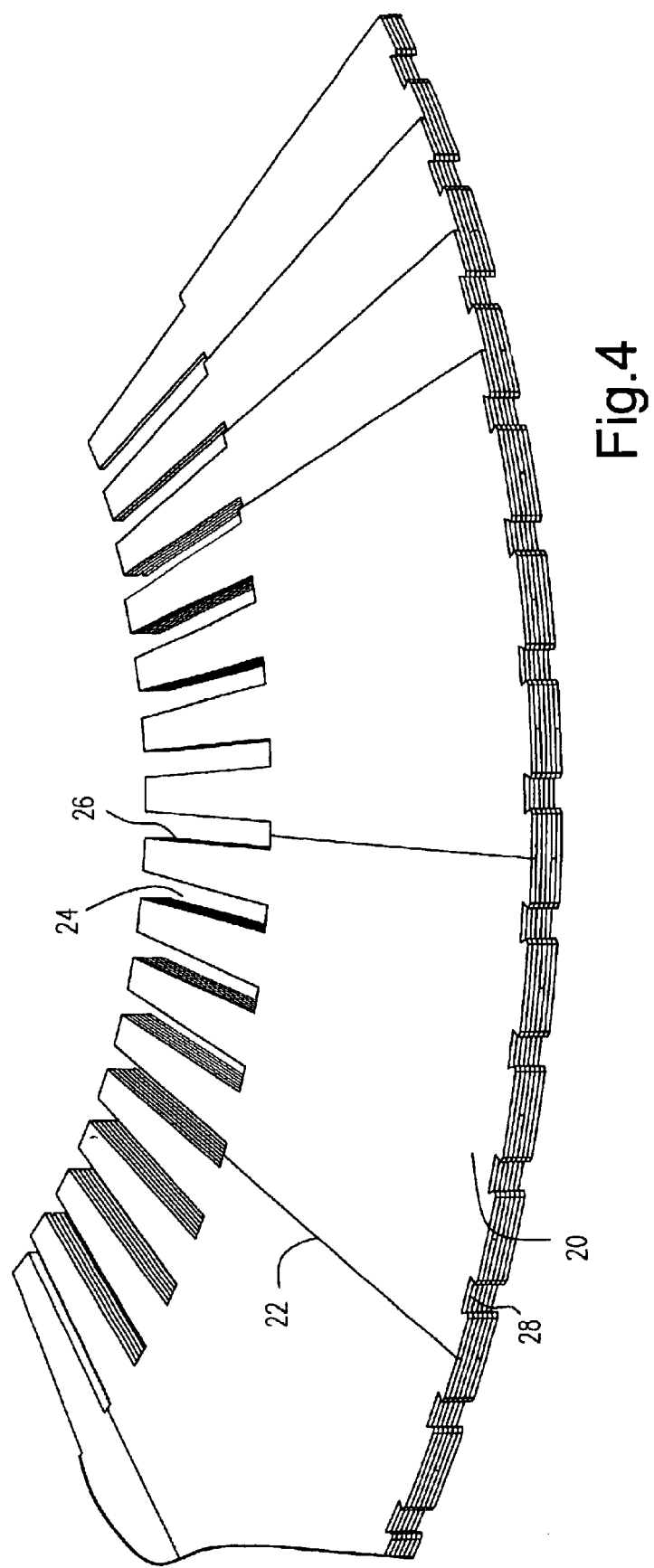
FIG. 4 is an enlarged perspective view of a plurality of punchings arranged in annular arrays thereof.

Referring particularly to FIG. 4, a plurality of punchings 20 are illustrated. In the illustrated form of punchings, each punching has a generally radially extending edge 22, a plurality of full radially extending slots 24 spaced circumferentially one from the other along an inner, circumferentially extending margin and a radially extending half-slot 26 along opposite sides 22 of the punching adjacent the inner margin. Each punching also includes a dovetail shape 28 at circumferentially spaced locations along the outer margin thereof. As illustrated in FIG. 4, there are six layers of superposed punchings 20 for illustration purposes, although it will be appreciated that greater or fewer numbers of layers may be provided. It will be seen in FIG. 4 that the radial juncture along the side edges 22 of adjacent punchings 20 of each layer does not underlie the joints between adjacent punchings of adjacent layers. In this illustrated and preferred embodiment, the punchings are thus staggered in a circumferential direction relative to one another and the joints of circumferentially adjacent punchings of every fourth layer lie in vertical alignment one with the other.

It will be appreciated, however, that the half-slots 26 along opposite sides of each punching form full slots with the half-slots 26 of the circumferentially adjoining punchings. The slots 24 and 26 open radially inwardly for receiving guides 18 as noted below. In a preferred embodiment, there are fifteen punchings in each annular layer, with the side edges 22 of the punchings lying in registration and in a common plane with one another. The punchings are stacked one on top of the other in a staggered manner to form a set of a plurality of annular arrays of punchings. The sets, in turn, are axially spaced from one another on the table by space blocks, not shown, disposed between the sets to form ventilation channels in the finished generator stator frame. Multiple sets of punchings are disposed along the table prior to lifting the sets from the table for installation into the generator frame as described below. As a specific example, fifteen punchings form an annular array thereof, the punchings being approximately 0.014 inches thick. A vertical height of approximately two inches for each set of punchings is preferred. This requires approximately 140–150 punchings, one over the other, to form a two-inch thick set of punchings in the axial direction.

As best illustrated in FIGS. 7 and 8, the fingers 16 terminate in guides 18. Each guide 18 includes a semi-spherical projection on the top of the associated distal end of the finger 16. As illustrated in FIG. 8, the distal end of the finger 16 is received within a slot 24 of a punching 20.

Referring to FIG. 2, there is illustrated a station 30 where the punchings 20 are inserted onto table 10 as the table 10 rotates, as indicated by arrow 31, past the inserting station 30. In this preferred embodiment of the present invention, an individual locates the punching on top of the table or on top of a previously arranged annular array of punchings. As the individual lays the discrete punchings 20 on the table or on top of a previously placed array, the punchings are disposed so that one or more fingers 16 is received within a full slot 24 or a half-slot 26 of the punching. The semi-spherical surfaces 18 assist to guide each punching about the fingers 16 and, hence, align the punching in a selected circumferential and radial position about the table relative to other punchings. As the table rotates, additional punchings are laid on the table and underlying arrays, with the side edges 22 adjoining one another. The individual also staggers the layers of punchings by offsetting the first of an additional layer of punchings relative to the underlying array of punchings so that the joints between the freshly laid punchings do not overlie joints of the underlying punchings. As the table rotates, the laid punchings are engaged by a roller system 40 (FIG. 2) which ensures that the bases of the slots, both full and half-slots, are engaged by the guides 18 thereby maintaining an accurate uniform alignment of the slots of the punchings and hence the punchings themselves on the table. System 40 maintains rollers against the outer margins of the circumferentially arrayed punchings. As the elevation of the uppermost layers of punchings increases, the mandrel with the attached fingers is also elevated. This is accomplished either continuously or incrementally in response to sensing the height of the uppermost layer of punchings and mechanically raising the mandrel and fingers in response to the sensed signal.

Prior to disposing the first punching on the table, the space blocks, not shown, are provided on the table and slightly elevate the lowermost layer of punchings and eventually the sets of punchings from the table. Additionally, and referring to FIG. 9, there is illustrated a portion of fastening elements for clamping the punchings to one another and maintaining the punchings in annular arrays thereof. The fastening elements include an inside diameter clamping system for clamping the sets of annular arrays of punchings to one another preparatory to removal of the punchings from the table. The clamping mechanism includes a rod 50 having a threaded lower end for threaded reception in a female threaded block 52 having lateral flanges 54. The block 52 has a width less than the width of the slots 24. Prior to locating the punchings on the table, the blocks 54 are positioned on the table such that each block 52 is received within a slot 24 of each punching forming the first annular array of punchings, the margins of the punchings defining the slots 24 receiving the block 52 resting on the flanges 54.

After a first set of multiple layers of punchings in annular arrays thereof are formed, space blocks are disposed on the upper layer of the punchings before a subsequent set of punchings are disposed on the table. The space blocks form ventilating passages for cooling the stator frame core when the sets of punchings are installed in the generator stator frame. As the laying of the punchings in the annular arrays and sets thereof progresses, the fingers are elevated by raising the mandrel until a predetermined depth of sets of punchings is obtained on the table. Once a predetermined thickness of the sets of punchings is obtained, the mandrel and fingers are lowered and the sets of punchings are clamped to one another prior to lifting them from the table.

Figure 3:
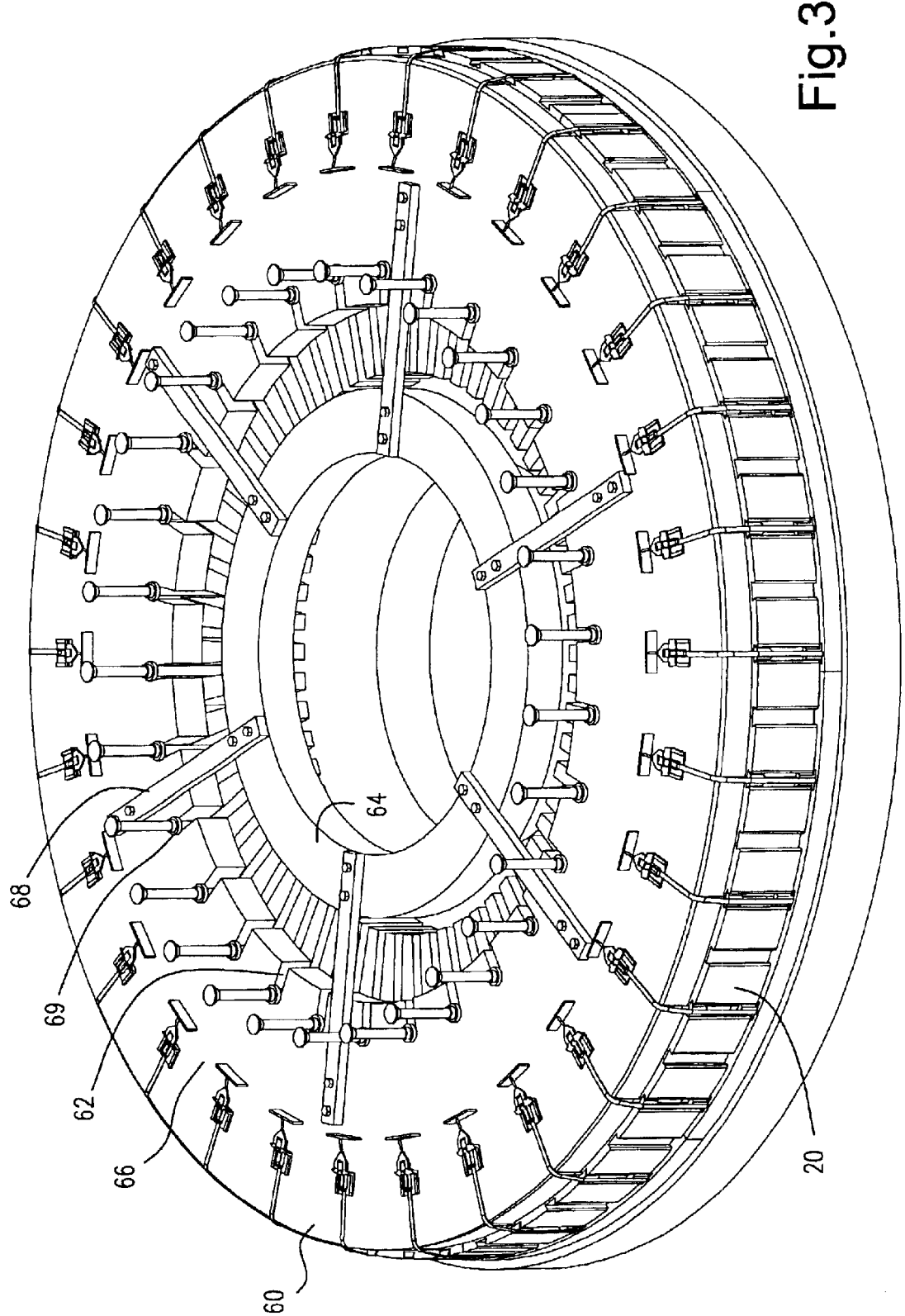
FIG. 3 is a perspective view similar to FIG. 2 illustrating a cover plate disposed over the stacked sets of punchings to facilitate removal of the set from the table.

To accomplish that, a lift plate or cover 60 is lowered onto the sets of the annular layers of punchings. As illustrated in FIG. 3, the cover 60 includes a plurality of radially inwardly opening slots 62 spaced one from the other in alignment with selected aligned slots of the punchings along the inside diameter of the sets thereof. The cover 60 also includes an inner ring 64 secured to an outer ring 66 thereof by beams 68. With the cover resting on the uppermost layer of punchings, the clamp rods 50 are inserted through the selected openings 62 of cover 60 and through the aligned openings of the punchings for threaded insertion into the blocks 52. A locking nut 69 is threaded down onto the top of the cover to clamp the inner diameters of the punchings to one another between the locking nut 69 and the flanges 54 of blocks 52. As illustrated in FIG. 3, a plurality of such clamp mechanisms are arrayed about the interior diameter of the punchings and cover.

Figure 5:
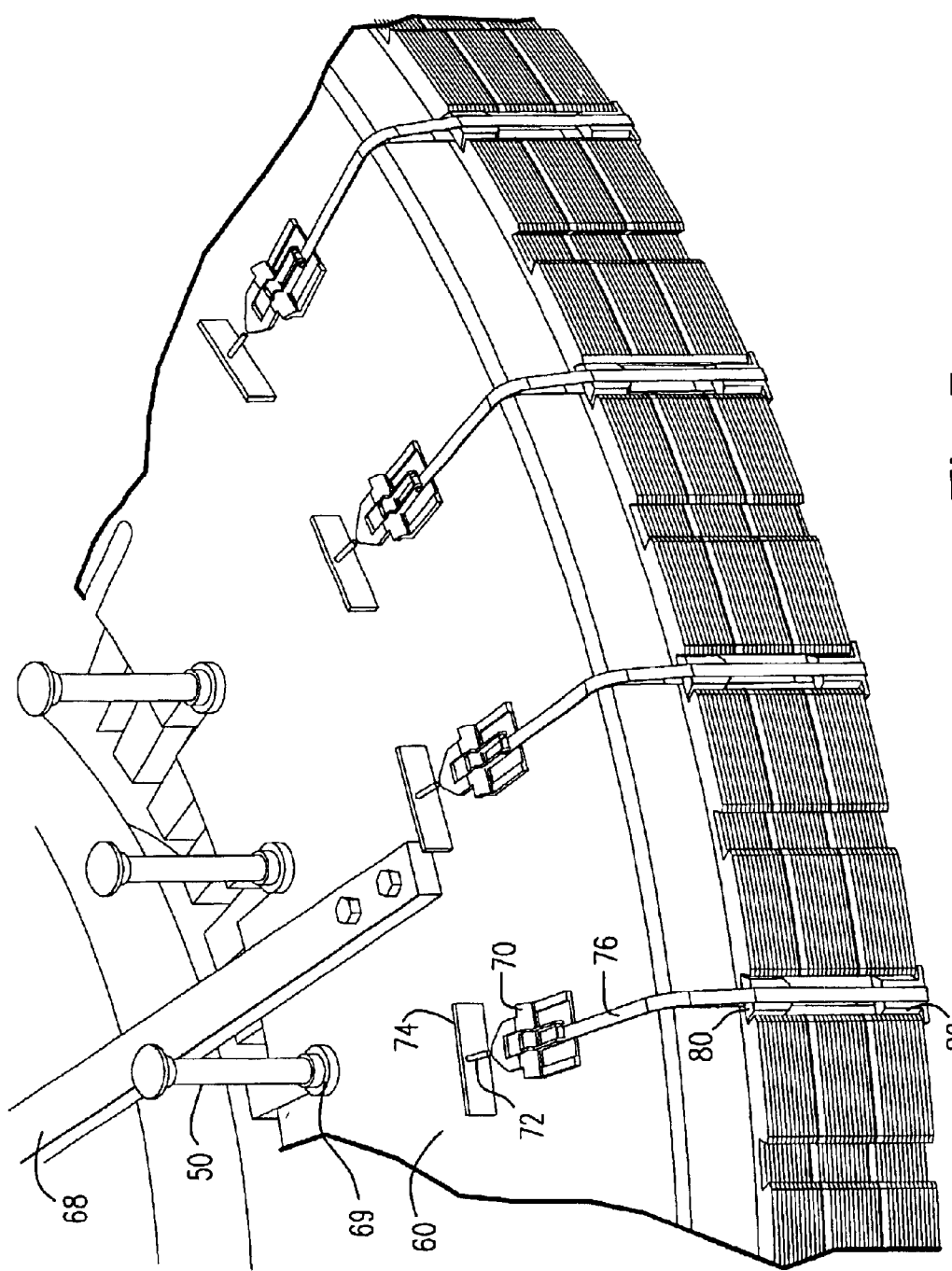
FIG. 5 is an enlarged fragmentary view similar to FIG. 3 illustrating clamps for clamping the sets of annular arrays of punchings to one another.
Figure 6:
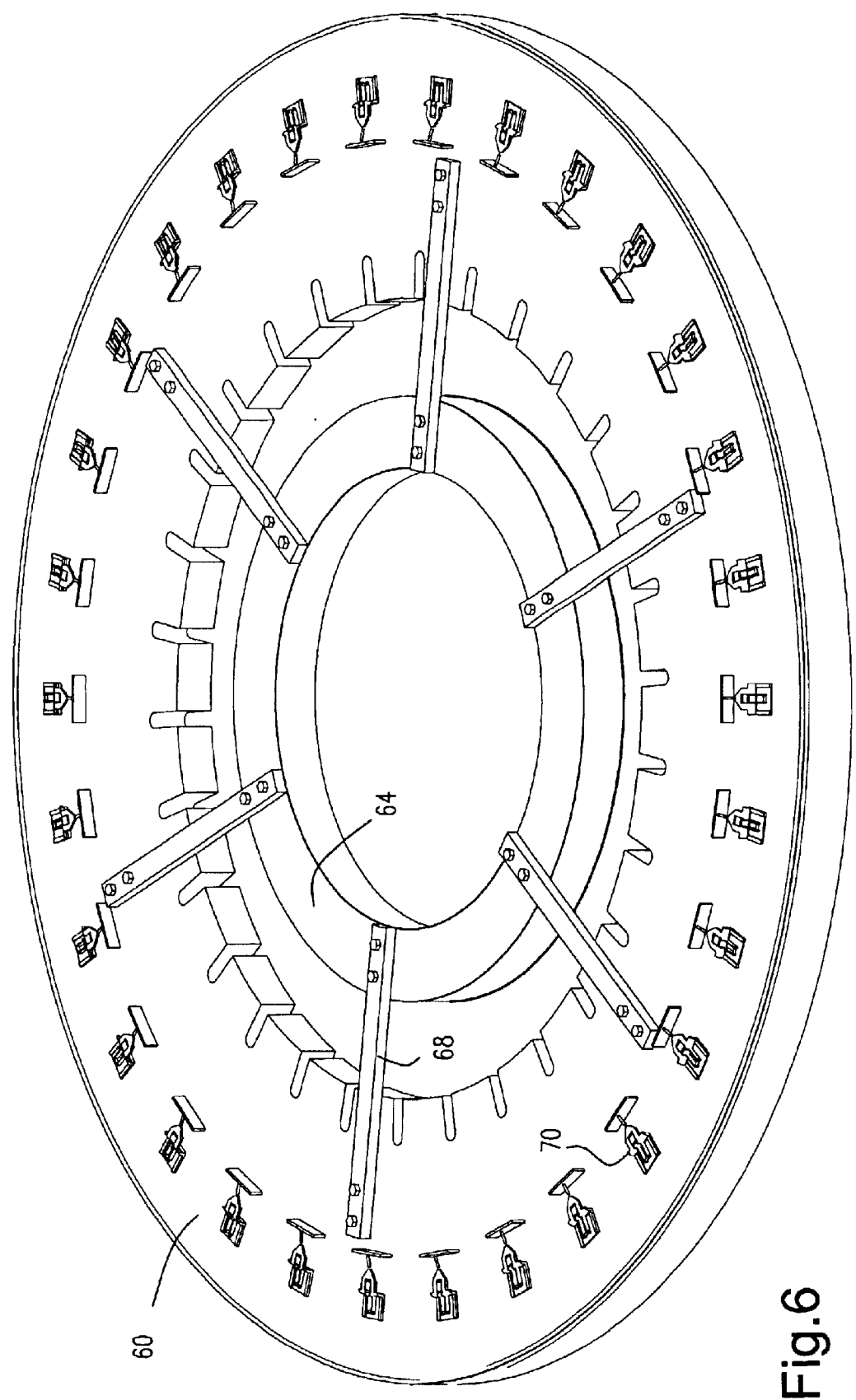
FIG. 6 is a perspective view of the lift plate.

To clamp the punchings to one another along their outer peripheries, the cover 60 includes as part of the fastening elements a plurality of ratchet clamps 70 carried by the cover 60 at circumferentially spaced positions thereabout. Each ratchet clamp 70 is trapped by guideways for radial sliding movement relative to cover 60. A spring 72 interconnects each clamp 70 and a fixed mount 74 on the cover such that the ratcheting action tensions or loosens the tension on the spring 72. The clamps 70 carry straps 76. The straps 76 extend from each clamp 70 and about a pair of upper and lower dovetail-shaped guide blocks or fixtures 80 and 82, respectively. As illustrated in FIG. 10, the upper block 80 has beveled edges 84 and a slot 86 extending vertically along its inside surface. The lower block 82 includes a slot 88 formed along its inside surface. Block 82 also includes a pair of flanges 90 projecting laterally from its opposite sides. As illustrated in FIG. 5, the flanges 90 on the lower blocks 82 underlie the lowermost punchings on opposite sides of the dovetail slots in which the blocks 82 are received. Each upper block 80 engages in a dovetail-shaped slot on the uppermost set of punchings. The straps 76 pass along the outside surfaces and the inside slots 86 and 88 of the upper and lower blocks, respectively, and are coupled to the clamp 70. By ratcheting the clamps 70 and tensioning the springs 72, the outer margins of the punchings of the sets of punchings are clamped between the flanges 90 of the lowermost plugs 82 and the cover 60 at circumferentially spaced locations about the assembly.

The cover mounts one or more lifting rings, not shown, attached at various lifting locations about the cover. By using a crane, not shown, the cover and the sets of punchings attached to the cover can be removed from the table for installation into the generator stator frame.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for locating and stacking punchings to form generally annular arrays of superposed punchings for use in a generator stator core, comprising:

a table rotatable about an axis for receiving and stacking the punchings;

a mandrel rotatable with the table about said axis and located radially to the table and movable vertically relative to the table; and a plurality of circumferentially spaced fingers projecting generally radially outwardly from and carried for rotation and vertical movement with said mandrel for reception in radially inwardly opening slots of the punchings to guide the punchings received on the table to form the annular arrays of superposed punchings.

2. Apparatus according to claim 1 wherein said fingers have projecting guides at tips thereof for guiding the punchings onto the table.

3. Apparatus according to claim 1 including means for engaging the outer periphery of the punchings for biasing the punchings radially inwardly against the fingers.

4. Apparatus according to claim 1 including a lift plate for overlying the table and the annular arrays of punchings, and means carried by the lift plate for retaining the punchings in stacked annular arrays thereof enabling the stacked annular arrays of punchings to be lifted along with the lift plate from the table.

5. Apparatus according to claim 1 including a lift plate for overlying the table and the annular arrays of punchings, and straps carried by said lift plate and engageable with the punchings, enabling the stacked annular arrays of punchings to be lifted along with the lift plate from the table.

6. Apparatus according to claim 5 including a plurality of fastening elements extending between fixtures underlying the annular arrays of punchings and the lift plate for clamping the punchings to one another and then maintaining the punchings in annular arrays thereof while being lifted.

7. Apparatus according to claim 1 including a lift plate for overlying the table and the annular arrays of punchings, and a plurality of fastening elements extending between fixtures underlying the annular arrays of punchings and the lift plate for clamping the punchings to one another and maintaining the punchings in annular arrays thereof while being lifted.

8. Apparatus for locating and stacking punchings to form generally annular arrays of superposed punchings for use in a generator stator core, comprising:

a table rotatable about an axis for receiving and stacking the punchings;

a plurality of circumferentially spaced fingers rotatable with the table and movable generally vertical relative to the table, said fingers projecting generally radially outwardly for reception in radially inwardly opening slots of the punchings to guide the punchings received on the table to form the annular arrays of superposed punchings;

a lift plate for overlying the table and the annular arrays of punchings; and means carried by the lift plate for retaining the punchings in stacked annular arrays thereof enabling the stacked annular arrays of punchings to be lifted along with the lift plate from the table.

9. Apparatus according to claim 8 including straps carried by said lift plate and engageable with the punchings, enabling the stacked annular arrays of punchings to be lifted along with the lift plate from the table.

10. Apparatus according to claim 8 wherein said means includes a plurality of fastening elements extending between fixtures underlying the annular arrays of punchings and the lift plate for clamping the punchings to one another and maintaining the punchings in annular arrays thereof while being lifted.

* * * * *